US008749360B2

(12) United States Patent
Chraime et al.

(10) Patent No.: US 8,749,360 B2
(45) Date of Patent: Jun. 10, 2014

(54) SYSTEMS AND METHODS FOR SLEEP MANAGEMENT

(75) Inventors: Sean Chraime, Brooklyn, NY (US);
Micah Collins, Brooklyn, NY (US);
Andrew Skurdal, Jersey City, NJ (US);
Ezra Ashkenazi, Rahway, NJ (US)

(73) Assignee: SDI Technologies, Inc., Rahway, NJ (US)

( * ) Notice: Subject to any disclaimer, the term of this patent is extended or adjusted under 35 U.S.C. 154(b) by 531 days.

(21) Appl. No.: 12/984,398

(22) Filed: Jan. 4, 2011

(65) Prior Publication Data

US 2011/0163859 A1 Jul. 7, 2011

Related U.S. Application Data

(60) Provisional application No. 61/292,103, filed on Jan. 4, 2010.

(51) Int. Cl.
*G08B 21/00* (2006.01)

(52) U.S. Cl.
USPC .............. 340/309.16; 340/309.3; 340/286.02; 340/575; 340/384.1; 368/9; 368/13

(58) Field of Classification Search
USPC ......... 340/309.3, 309.16, 575, 286.02, 384.1; 368/9–14
See application file for complete search history.

(56) References Cited

U.S. PATENT DOCUMENTS

| 6,229,430 | B1 | 5/2001 | Smith Dewey |
| 6,928,031 | B1 | 8/2005 | Kanevsky et al. |
| 2003/0001727 | A1* | 1/2003 | Steinmark ................ 340/309.15 |
| 2004/0160337 | A1* | 8/2004 | Auyang et al. ........... 340/825.24 |
| 2005/0104720 | A1* | 5/2005 | Chon et al. ............... 340/309.16 |
| 2009/0016166 | A1 | 1/2009 | Abuelsaad |
| 2009/0303066 | A1* | 12/2009 | Lee et al. ...................... 340/679 |

* cited by examiner

*Primary Examiner* — Mohammad Ghayour
*Assistant Examiner* — Mark Rushing
(74) *Attorney, Agent, or Firm* — Leason Ellis LLP

(57) ABSTRACT

A sleep management application on a computing device having a processor and a storage medium executes code that establishes to a server that maintains data pertaining to the computing device or to a user, retrieves data from the remote server, and generates a custom interface to configure a feature of the computing device. The custom interface is used to program a sleep management setting. In one implementation, a method uses the sleep management application to provide an alarm function using external data from a remote server. The sleep management application can receive the external data from the remote server and analyze the external data to identify elements that pertain to the sleep management application. Then, the sleep management application can generate a control signal based on the elements, and modify a setting governing an operation of the alarm function in accordance with the control signal.

15 Claims, 14 Drawing Sheets

SYSTEMS AND METHODS FOR SLEEP MANAGEMENT

CROSS-REFERENCE TO RELATED APPLICATIONS

The present application claims the benefit of U.S. patent application Ser. No. 61/292,103, filed Jan. 4, 2010, which is hereby incorporated by reference in its entirety.

TECHNICAL FIELD OF THE INVENTION

This disclosure relates generally to the field of consumer electronic devices and, in particular, to systems and methods in support of enhanced consumer electronic devices for sleep management.

BACKGROUND OF THE INVENTION

Alarm clocks have traditionally been used as a primary means for sleep management. These devices usually provide limited alarm settings options including what sounds are played when the alarm is triggered. In traditional alarm clocks, sound options are usually limited to an alarm, a radio or an audio CD. The user typically has the ability to manually preselect which type of sound is played, and sometimes has the option of first playing one type of sound, then playing another type of sound after a predetermined time period. The user can also preselect the radio station or CD that is to be played. In the case of a radio station, the user may preselect a radio station that plays a certain type of audio content, such as a light jazz radio station or the like. However, the recent proliferation of consumer electronic and computing devices having various software applications and extensive interoperability has significantly expanded user's sleep management options. For example, a consumer electronic device may be configured to function as an alarm clock. The device may also be connected to the traditional alarm clock and be used by the user to configure alarm settings and to select audio content to be reproduced on the alarm clock.

In addition, various consumer electronic and computing devices have frequent, if not constant network connectivity. These devices are capable of receiving a vast amount of information from remote data servers through the Internet. For example, it is common for users of capable devices to receive traffic and/or weather updates for a specific location. In many instances, various elements within this received information result in additional considerations for a user. For instance, if a weather forecast predicts inclement weather, and/or a traffic report indicates delays on a certain road, a user may wish to account for these current/future events by waking up at a time other than that which he/she is otherwise accustomed. However, there is presently no system or method that enables such accounting and/or considerations to be effectively implemented.

It is with respect to these considerations and others that the disclosure made herein is presented.

SUMMARY OF THE INVENTION

Technologies are presented herein for a system and method for enhancing a sleep management application.

In accordance with a broad aspect of the invention, a computing device executes code that implements a sleep management application which can, in certain implementations, provide control over a peripheral device, and, more particularly, control that executes either a user's settings or settings that are received dynamically from an external source that may transform or otherwise alter the user's or the device's settings. As such, changes in local weather or traffic can influence the settings in the peripheral device, and so can changes based on other information received from a remote source, all according to the operation of the sleep management application. As a result, for example, an alarm function of a peripheral device or the computing device itself can be adjusted even while the user sleeps to account for such changes.

According to one aspect, the sleep management application cooperates with a computing device having a processor and a storage medium. The sleep management application utilizes one or more software modules that are stored on the storage medium and executed in the processor. The sleep management application operates by establishing a communications link with a server that maintains data pertaining to the computing device or to a user. The sleep management application retrieves data from the remote server and generates a custom/tailored interface based on the data in order to configure a feature of the computing device. Then, the sleep management application is programmed with a sleep management setting using the custom/tailored interface to implement the feature so-configured.

According to another aspect, a computer implemented method for enhancing a sleep management application operating on a computing device and having an alarm function is provided. The computing device has a processor and a storage medium, and the sleep management application has one or more software modules stored on the storage medium and executed in the processor. A communications link between the sleep management application and a remote server is initiated, the remote server having external data pertaining to the computing device or to a user. The sleep management application receives the external data from the remote server and analyzes the external data to identify elements that pertain to the sleep management application. Then, the sleep management application generates a control signal based on the identified elements and modifies a setting governing an operation of the alarm function of the computing device in accordance with the control signal.

According to yet another aspect, a computer implemented method for enhancing a sleep management application operating on a computing device is provided. The computing device has a processor and a storage medium, and the sleep management application has one or more software modules stored on the storage medium and executed upon the processor to cooperate therewith and implement enhanced sleep-management functionality. The sleep management application collects data that is perceptible to, or usable by, the computing device and analyzes the data to identify elements that pertain to the sleep management application. The sleep management application then generates a control signal based on the identified elements and modifies the operation of the sleep management application in accordance with the control signal.

According to yet another aspect, a sleep management system is provided including a processor, a storage medium accessible by the processor, and one or more software modules encoded on the storage medium which execute in the processor and which, when executed by the processor, cause the sleep management system to initiate a communications link with a remote server, the remote server having external data pertaining to a computing device or to a user. The software modules, in cooperation with the processor, further cause the sleep management system to receive the external data from the remote server and analyze the external data to identify elements that pertain to the sleep management application. Then, the software modules cause the sleep management system to generate a control signal based on the identified elements and modify a setting governing an operation of an alarm function in accordance with the control signal.

DETAILED DESCRIPTION OF CERTAIN
EMBODIMENTS OF THE INVENTION

Example embodiments are described herein in the context of systems, methods and computer program products for sleep management. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings.

Figure 1:
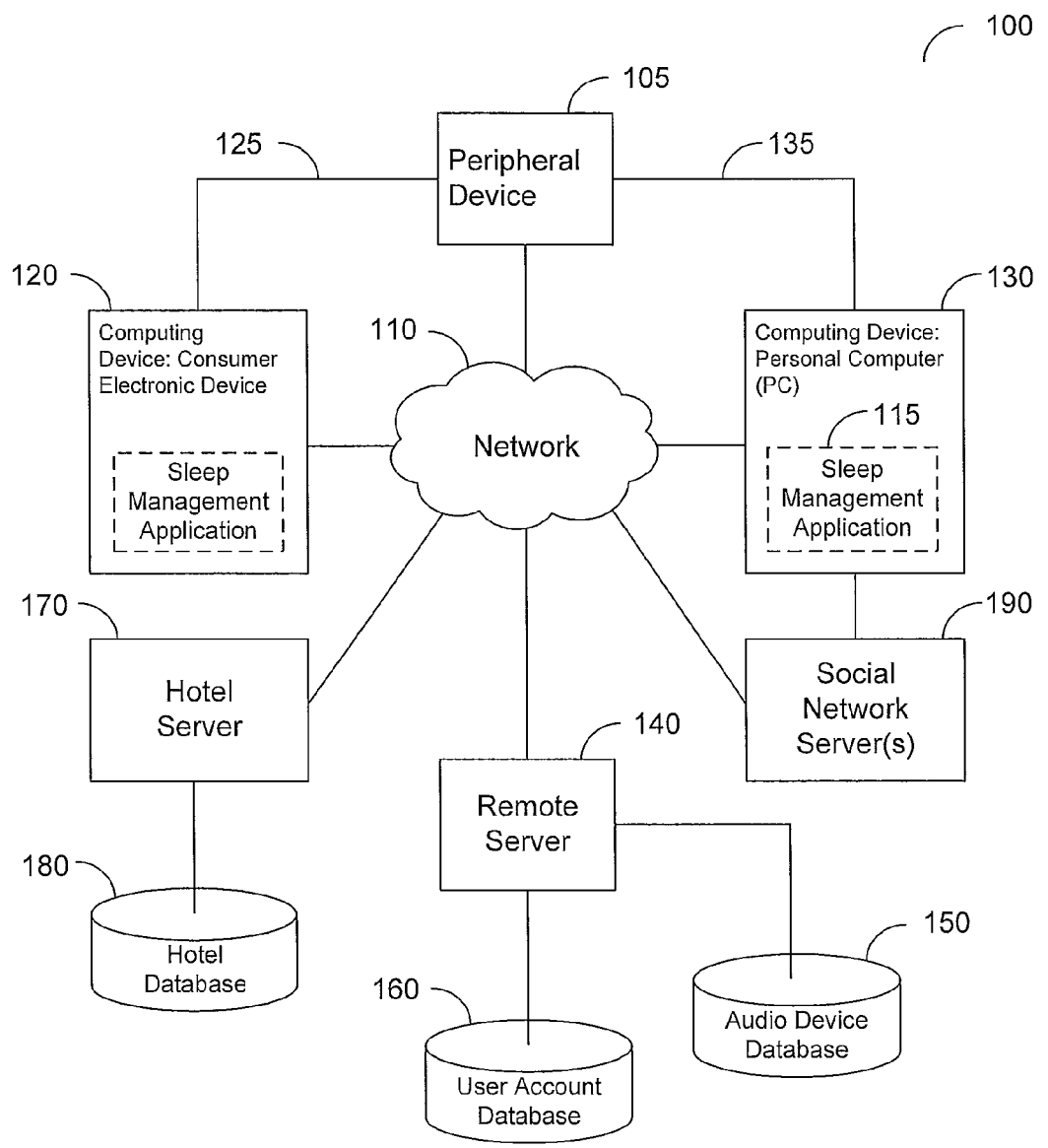
FIG. 1 illustrates a schematic block diagram of a sleep management system in accordance with one example embodiment.

FIG. 1 illustrates a schematic block diagram of a sleep management system 100 in accordance with one example embodiment. The system 100 includes one or more peripheral devices 105, such as an audio reproduction device (for example, an alarm-clock radio or a similar device having audio reproduction functionality such as a speaker as one example of an output device for providing an alert to a user as part of the alarm function). The system 100 further includes a computing device such as a consumer electronic device 120 (for example, a smart phone, portable audio/video player, personal digital assistant (PDA), digital reader, or any other type of electronic device having data processing/storage capabilities), and/or a personal computer 130 (for example, a desktop, laptop, tablet, or notebook computer). Device 120 and PC 130 may be connected to the peripheral device 105 via dedicated analog/digital connectors 125 and 135, respectively, and/or via a wired or wireless, network 110, such as Ethernet, 802.11b/g/n, and Bluetooth. In one example, the consumer electronic device 120 may be docked with the peripheral device 105, in which case the connector 125 may be a generic or custom docking connector having digital and/or analog input/output ports. In one example embodiment, the connector 125 may be a Universal Serial Bus (USB) connector or other types of serial data connectors. In one example embodiment, the connector 125 may include a cable. The personal computer 130 may be connected to the peripheral device 105 via the connector 135, which may also be a USB connector or other types of serial or parallel data connectors.

The system 100 further includes a sleep management application 115, which may reside on the consumer electronic device 120 and/or on the personal computer 130. In general, the sleep management application 115 includes one or more software modules that provide configuration and storage of various sleep management settings for the peripheral device 105, including but not limited to clock settings, alarm settings, radio settings, audio settings, network settings, user profile settings and various other configuration parameters and settings. The sleep management application 115 may be provided by the manufacturer of the peripheral device 105, the manufacturer of the computing device 120, 130, or a third party. In one example embodiment, the sleep management application 115 may be written and distributed by the manufacturer of the peripheral device 105, such as the manufacturer of an alarm clock radio. In another example, the manufacturer of the audio reproduction device 105 may provide Application Programming Interfaces (APIs) to the peripheral devices 105 so that third-party software developers can create their own sleep management applications 115 using the provided APIs. The application 115 may be executed by the operating system (OS) or the Internet browser of the consumer electronic device 120 and/or personal computer 130. The sleep management application 115 may be written using C, C++, Perl, Java, Visual Basic, XML, HTML and other known programming languages.

The system 100 may further include various local and remote servers 140, 170, 190 that operate in conjunction with the sleep management application 115 to provide various information and services to the sleep management application 115, consumer electronic device 120, personal computer 130, peripheral device 105, and/or application users. In one example embodiment, the system 100 may include a remote server 140 hosted by the manufacturer of the peripheral device 105 or a third party. In one embodiment, server 140 may maintain and provide to the sleep management application 115 information about various peripheral devices 105, which may be stored in a database 150, and serve as a backup for the user account information, which may be stored in a database 160. In another example embodiment, the peripheral device 105 may be located in a hotel, in which case, the system 100 may include a local hotel server 170 and hotel database 180. The sleep management application 115 may communicate with the hotel server 170 via network 110 to provide and/or receive information about various hotel services. In yet another example embodiment, the system 100 may include various social networking and/or messaging servers 190. The sleep management application 115 may provide and/or receive status update notifications about activities of the application user or other users to/from the social networking servers 190, such as Twitter® or Facebook®, or send email or instant messages with the user activity information using messaging servers 190. Operation of these and other servers will be described in greater detail herein below.

In an alternate arrangement, sleep management application 115 can be configured to receive information from one or more servers 140, 170, 190, and to further utilize the received information to enhance and/or modify the operation of the sleep management application 114 including an alarm function. By way of example, sleep management application 115 can utilize the computing device's 120, 130 existing Internet connection to initiate a connection between the sleep management application 115 and one or more local or remote servers 140, 170, 190. The sleep management application 115 can then receive external data (i.e., data that is present on the server 140, 170, 190 but not on the computing device 120, 130) from the server(s) 140, 170, 190. Preferably, the data received from the server(s) pertains to the computing device 120, 130 (such as data relating to the computing device's 120, 130 location), the user (such as personal scheduling information and/or personal favorites/interests), and/or the sleep management application 115, though in principle the sleep management application 115 can receive any form of data. By way of example, in one arrangement the sleep management application 115 receives traffic and/or weather data from one or more traffic/weather related websites/servers. This data can then be used to generate control signals that configure and control various settings and functions of the sleep management application 115 in a manner that transforms or changes user/device settings (i.e., existing values that are set in the device) that may have been input manually by the user through the sleep management application interface, the computing device 120, 130, and/or the audio reproduction device 105, as will be described in greater detail below. Additionally, the data can be received in response to a specific query by the sleep management application 115 and/or the computing device 120, 130 (such as a query regarding current traffic conditions in a specific area) and/or in response to a standing query (such as weather in the user's hometown).

It should be noted that while the foregoing description of an arrangement of sleep management system 100 incorporates numerous components, in other arrangements fewer or additional components can be present. Thus, for example, in one particular arrangement, a computing device 120, 130 can communicate with and receive data from various external servers 140, 170, 190 through network 110, free of communication with or reliance upon the peripheral device 105. In such an arrangement, a speaker on-board the device 120, 130 can be the output device that provides an alert to the user as the alarm function.

Figure 2:
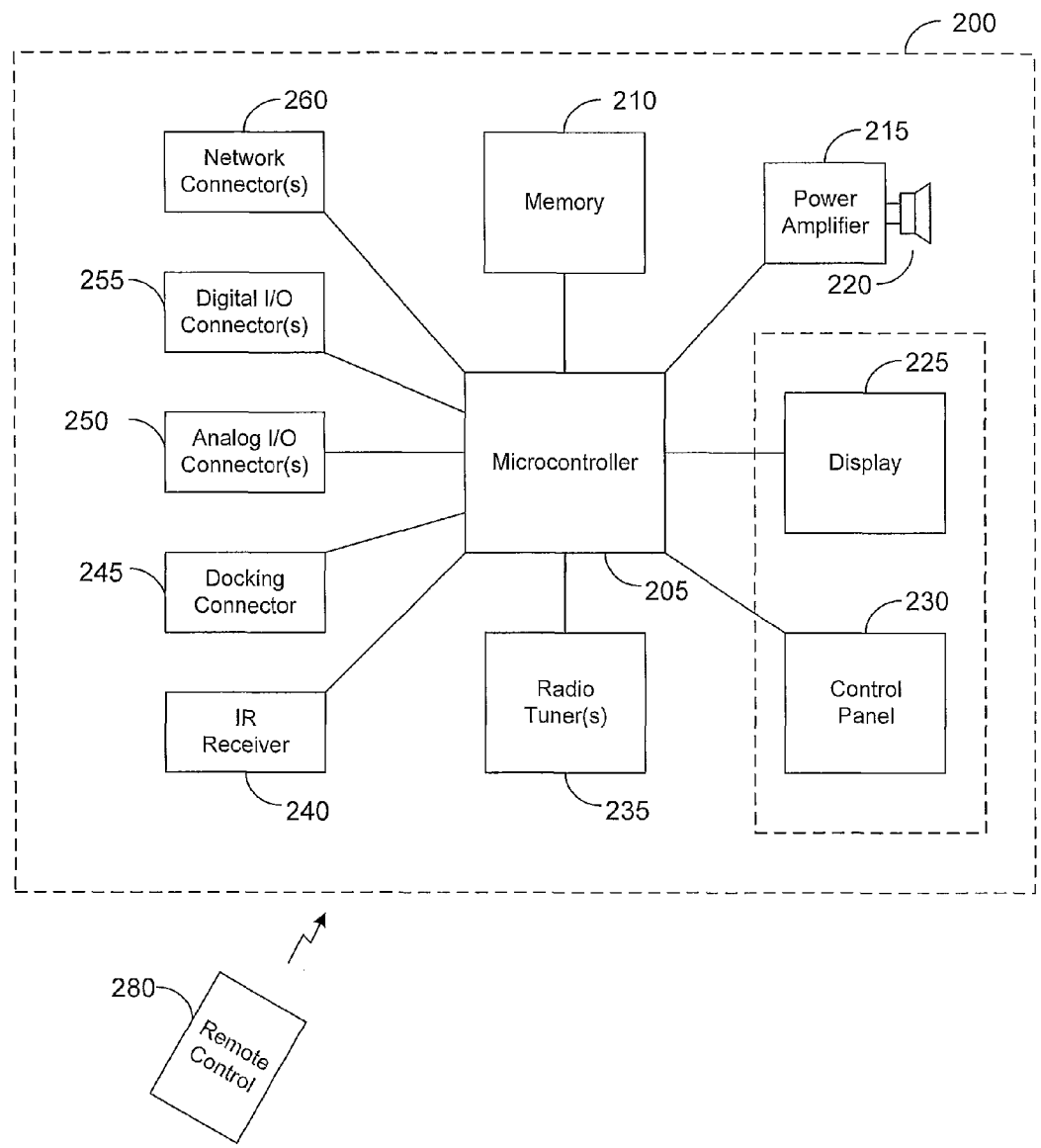
FIG. 2 illustrates a schematic block diagram of a peripheral device, such as an alarm clock, in accordance with one example embodiment.

FIG. 2 illustrates a schematic block diagram of the peripheral device 105 in accordance with one example embodiment. The device 200 may be a digital alarm clock or other such device having additional functionality such as audio reproduction. The device 200 may include a microcontroller 205, such as a simple 8-bit microcontroller or a more complex ARM-based microprocessor, for controlling operation of the device 200 and a memory 210, such as read-only memory (ROM) or random access memory (RAM), for storing program instructions and user settings for operating the device 200. The device 200 may also include an internal power amplifier 215 and speaker 220 for reproducing audio sounds. The device 200 may also include a display 225, such as an LCD display, for displaying time/date and other information and a control panel 230, which may include a plurality of programmable buttons for controlling operation of the audio reproduction device 200. In one example, the display 225 may be a touchscreen display and the control panel 230 may at least in part include a graphical user interface (GUI). The device 200 may also include one or more radio tuners 235, such as AM, FM, or satellite radio tuners. The device 200 may also include a plurality of digital/analog data connectors, such as infrared (IR) receiver 240 for receiving commands from a remote control 280, a docking connector 245 for docking the consumer electronic device 120 (in either a wired or wireless manner), an analog I/O connector 250 for connecting to the external speakers or a microphone, a digital I/O connector 255, such as a USB connector, for connecting to the personal computer 130 and/or the consumer electronic device 120, and a network connector 260, such as wired or wireless local area network (LAN) card or a Bluetooth® card. The device 200 may also include a remote control 280, which may communicate using RF or IR signals, to control various functions of the device 200 and/or functions of the sleep management application 115 residing on the consumer electronic device 120 and/or the personal computer 130. The device 200 may also include a CD player (not shown) or other internal audio source devices.

Figure 3A:
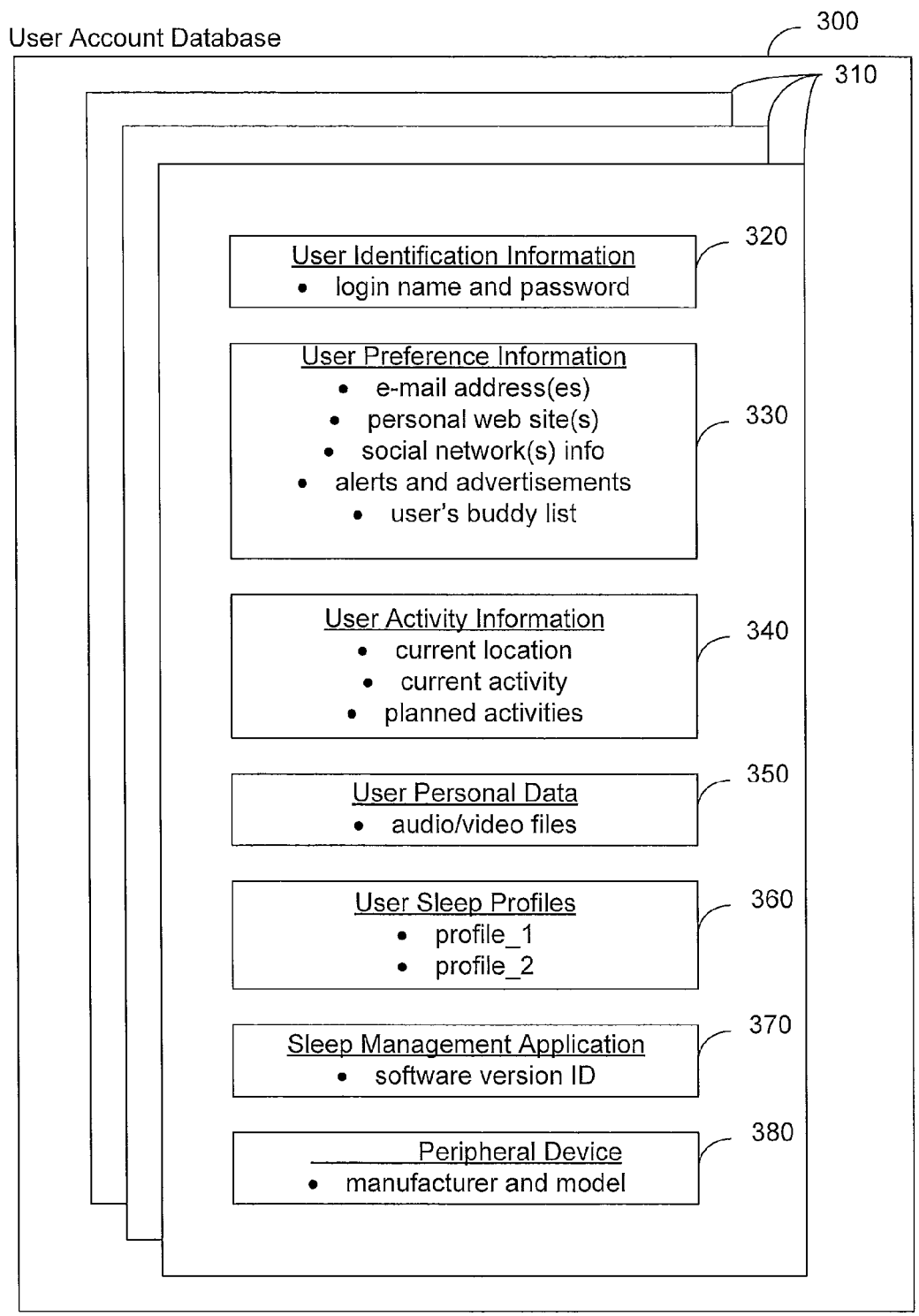
FIGS. 3-4 illustrate schematic block diagrams of databases maintained by the sleep management system in accordance with one example embodiment.

As indicated above, the sleep management application 115 enables configuration of various sleep management settings and functions (such as clock settings, alarm settings and functions, radio settings, audio settings, network settings, user profile settings and various other configuration parameters and settings) and storage of configuration settings for various peripheral devices 105 and computing devices 120, 130. To that end, the sleep management application 115 maintains a user account database that contains one or more accounts for various users of the application 115 that contain information pertaining to the user, the computing device 120, 130, the sleep management application 115, and/or the peripheral device 105. FIG. 3A illustrates one example embodiment of a user account database 300 containing user accounts 310. Each account 310 may include user identifying information 320 including a user's name as well as application login name and password. The account 310 may also include user preferences 330, including e-mail address, personal web site, social network information such as login name and password, user preferences with respect to alerts and advertisements, as well as a user's buddy list. The user account 310 may also include user activity information 340 including current location, current activity, such as sleeping, awake, listening to radio, etc., and planned activity, such as waking up at 7:30 AM, etc., for example. As will be described in greater detail below, the sleep management application 115 can analyze user activity information 340 in order to generate one or more control signals that can modify the operation of the computing device 120, 130, the sleep management application 115, and/or the peripheral device 105. The account 310 may also include user personal data 350 including audio/video files that may be reproduced on the peripheral device 105 or on the computing device itself. The account 310 may also include one or more user sleep profiles 360, which include data structures containing specific sleep management scenarios for various computing devices 120, 130 and/or peripheral devices 105. User sleep profiles 360 will be discussed in greater detail herein below. The account 310 may also include application version information 370 and information 380 about computing devices 120, 130 and/or peripheral devices 105 with which the sleep management application 115 is configured to operate.

As noted above, sleep profiles 360 contain specific sleep management scenarios for various computing devices 120, 130 and/or peripheral devices 105. These sleep profiles 360 can also be analyzed by the sleep management application 115 in order to generate one or more control signals that can modify the operation of the computing device 120, 130, the sleep management application 115, and/or the peripheral device 105, as will be described in greater detail below. In one example, a user may create sleep profiles for different days of the week; thus, for example, a weekday may have one sleep profile and a weekend may have a different sleep profile. In addition, the user may create different sleep profiles for different locations; thus, for example, the user may have one sleep profile at home and a different sleep profile when traveling on business. Moreover, sleep profiles 360 may differ based on the functionality of the computing devices 120, 130 and/or the peripheral device 105 with which the sleep management application 115 is operating. For example, if device 105 has a radio tuner, a sleep profile may indicate radio stations to which the device 105 must tune to. If the device 105 does not have a radio tuner, the sleep profile would indicate another audio source, such as a CD track, MP3 file or a network address, to be used by the device 105. By way of further example, if device 105 has video display means (such as an LCD screen) a sleep profile can indicate (i.e., identify) images or videos to be displayed by the device. The sleep profiles 360 can be easily created and stored by the user on the application 115. When the consumer electronic device 120 or personal computer 130 on which the application 115 runs is connected to the peripheral device 105, the user may launch the sleep management application 115 and select a sleep profile 360 to be executed by the application. Alternatively, the application 115 may automatically select and execute a profile that suits user preferences. In like manner, by way of example, the sleep profiles can indicate how the computing devices 120, 130 are to respond in the absence of a connection with a peripheral device 105.

Figure 3B:
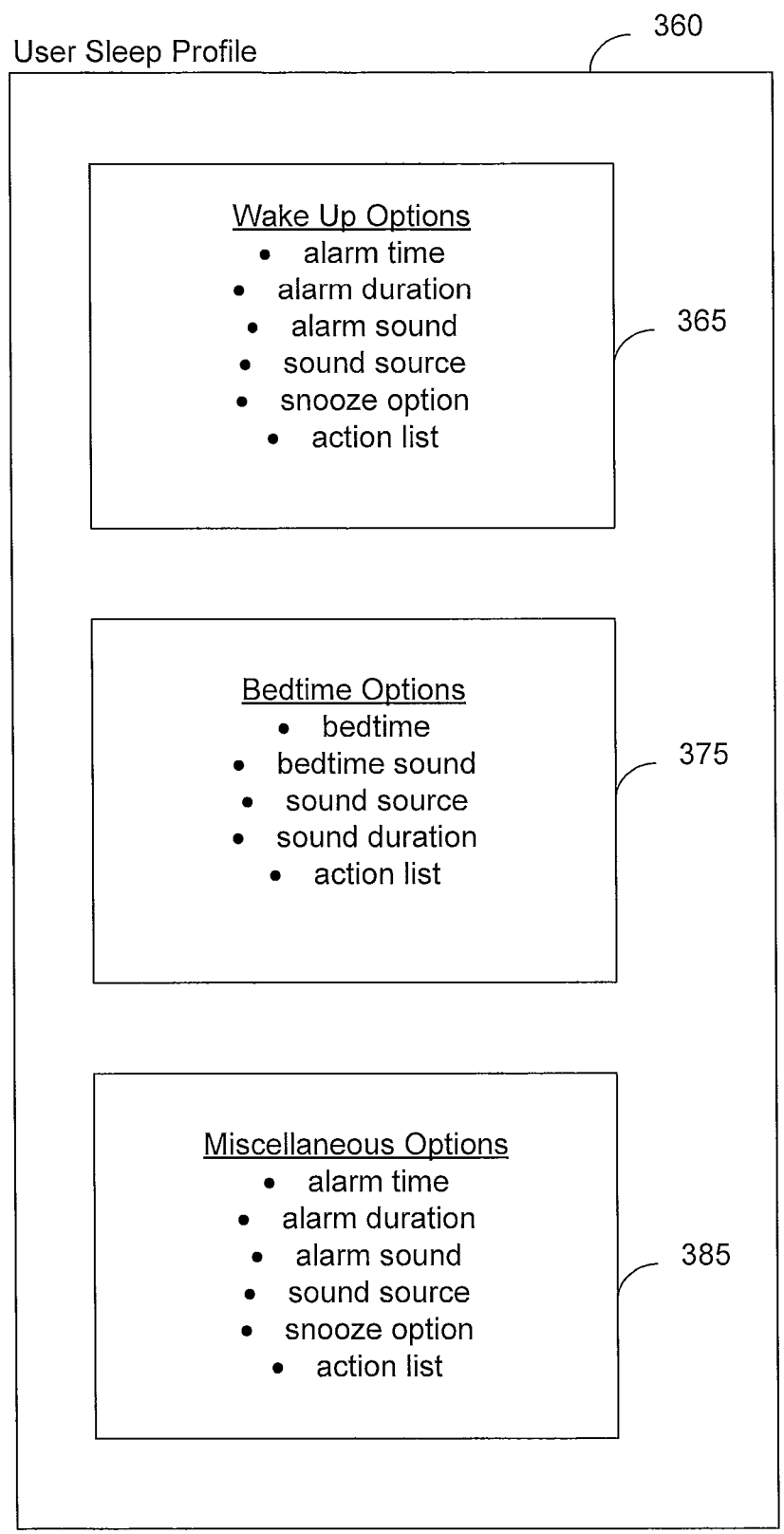

FIG. 3B illustrates one example embodiment of a user sleep profile 360 for a specific sleep management scenario. The profile 360 may include wake up options 365 including but not limited to the alarm time, alarm duration, alarm sound, such as volume, the source of sound, such as a preset radio station, a CD track or a MP3 file from the user's personal data 350 and snooze options, such as enable/disable snooze button on the audio reproduction device 105. The wake up options 365 may also include a list of actions to be taken by the sleep management application 115 when the alarm is activated. For example, the actions may include updating the user's Facebook page and sending an instant message to the user's buddy list indicating that the user is awake and listening to a certain radio station. The sleep profile 360 may also include bedtime options 375 including the time when user is going to bed, the sound to be activated when the user is going to bed, the sound source and duration as well as the list of actions to be taken when the user is going to bed. The sleep profile 360 may also include various miscellaneous options 385 including various miscellaneous alarm settings and action listings.

Figure 4:
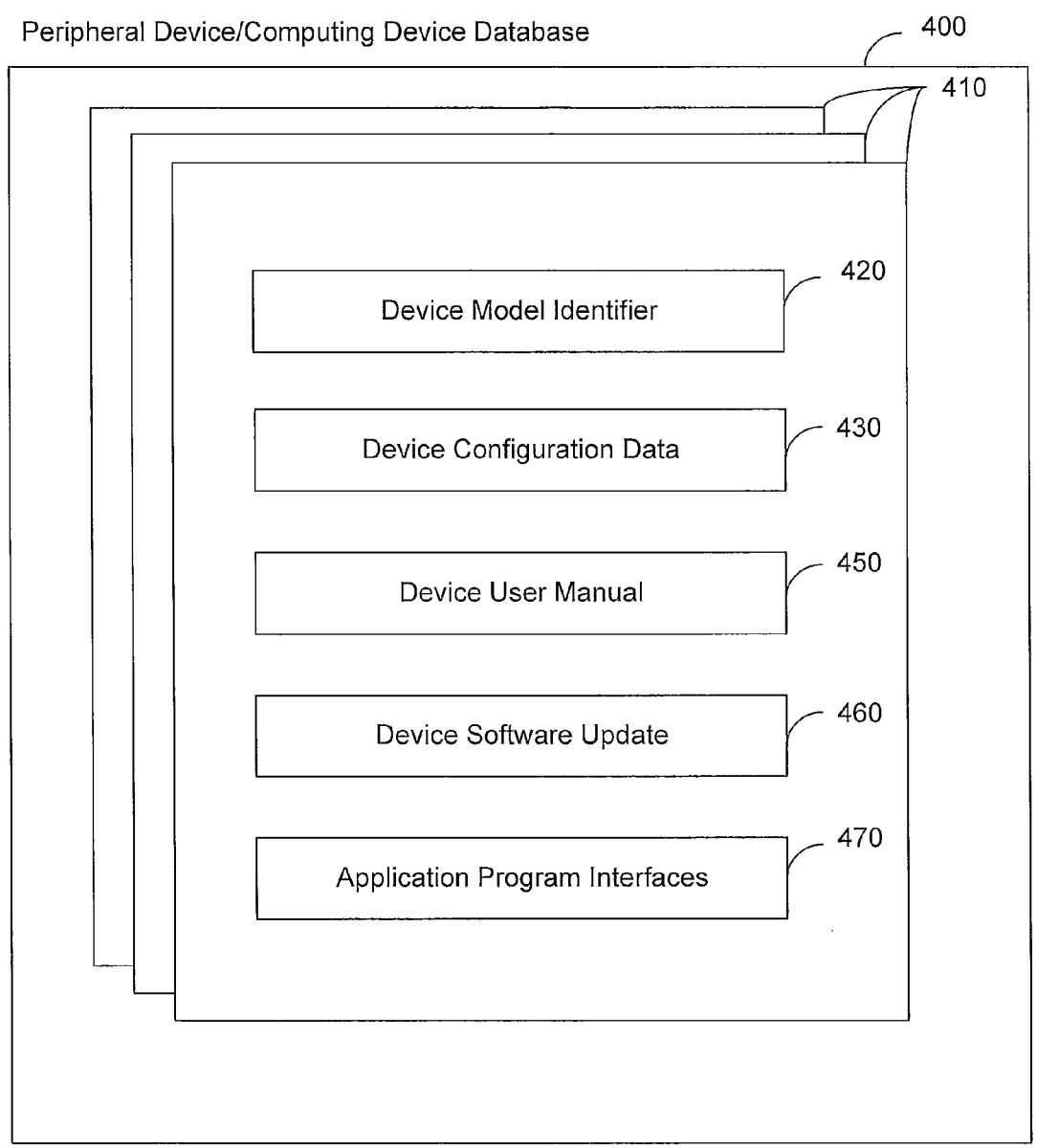

In one example embodiment, the user account database 300 or a back up thereof may be stored on the remote server 140 in a database 160. In addition, the remote server 140 may include a database of peripheral devices 105 and/or computing devices 120, 130. FIG. 4 illustrates one example embodiment of the peripheral device database 400. The database 400 includes records 410 for each manufactured peripheral device 105 and/or computing device 120, 130. A record 410 includes device model identifier 420, device configuration data 430, device user manual 450 in electronic format, device software update information 460, and various APIs 470 that allow sleep management applications 115 to communicate with the peripheral devices 105 and/or the computing devices 120, 130. The sleep management application 115 may request device-specific information from the database 400 in order to communicate with various peripheral devices 105 and/or computing devices 120, 130. In one example embodiment, a part of the information of the database 400 may be maintained by the sleep management application 115.

Figure 5:
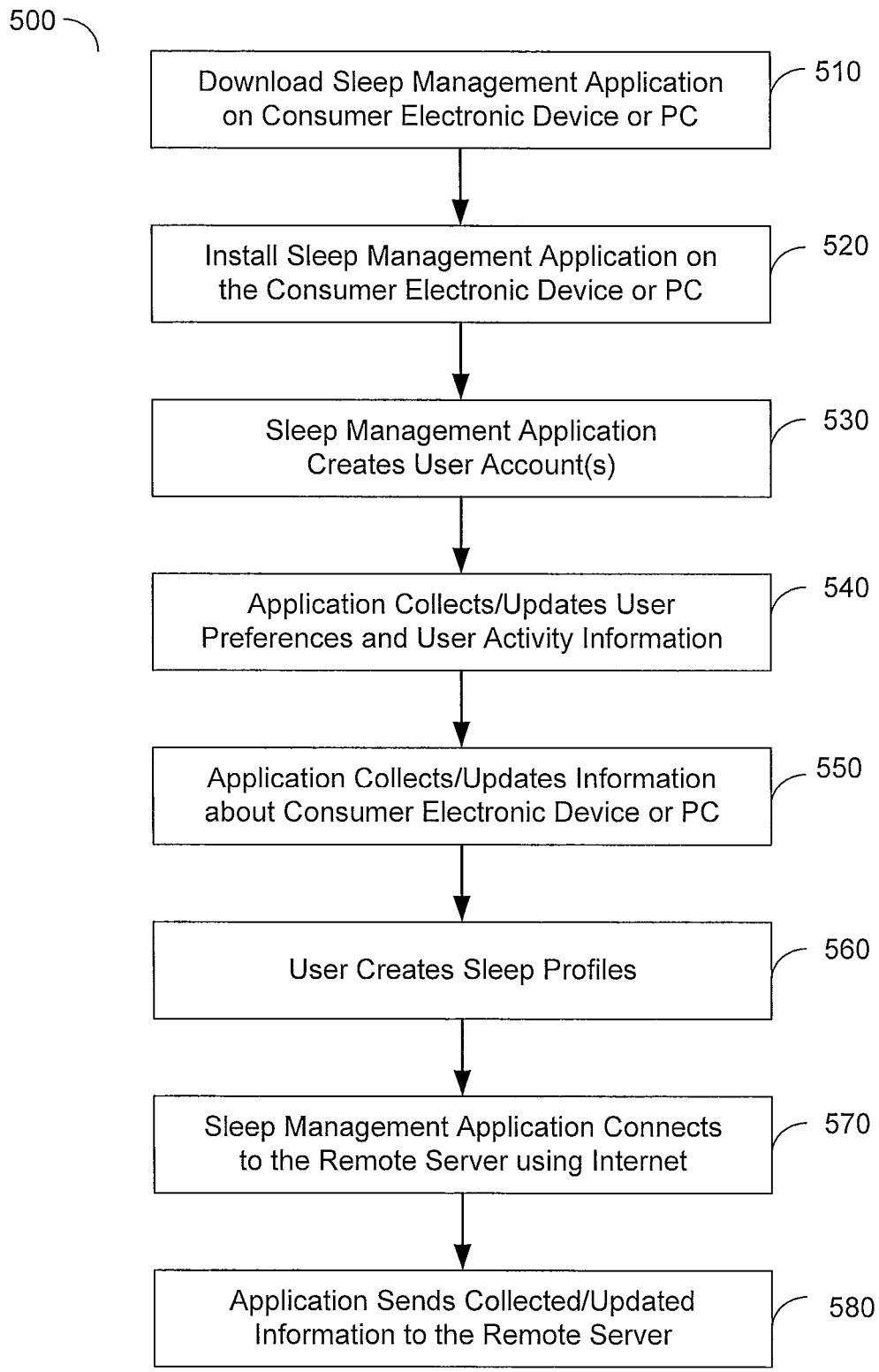
FIGS. 5-12 illustrate flow diagrams of the methods of operation of the sleep management system in accordance with one example embodiment.

FIG. 5 illustrates an example methodology 500 for activation of a sleep management application 115 on a consumer electronic device 120 or a personal computer 130. At step 510, a user may download the application 115 onto the consumer electronic device 120 or the personal computer 130. At step 520, the user may install the sleep management application 115 on the consumer electronic device 120 or the personal computer 130. At step 530, the sleep management application creates one or more user accounts 310 for application users. At this point, the user may provide user identifying information and select a login name and password. At step 540, the application 115 collects/updates user preferences, personal data and user activity information, and stores this information in a user account 310. At step 550, the application may collect/update information about the consumer electronic device 120 or the personal computer 130 on which it is executed, such as device model identifier and the like, and store this information in the user account 310. This information may be used to search for device- or computer-specific application updates and/or other device- or computer-specific functions. At step 560, the user may create various sleep profiles 360 using predefined sleep profile templates. The templates may include predefined data entry fields for entry of the necessary information. Notably, the templates may be device-specific. For example, the application may use the model number identifier of the peripheral device 105 and/or the computing devices 120, 130 to determine functionality of the device, such as a radio tuner, CD player, etc., and provide sleep profile templates that reflect features of the peripheral device 105 and/or the computing devices 120, 130. At step 570, the sleep management application 115 may connect to the remote server 140 through the network 110 and, at step 580, send all collected user account information to the remote server 140 for back up on the user account database 160.

Figure 6:
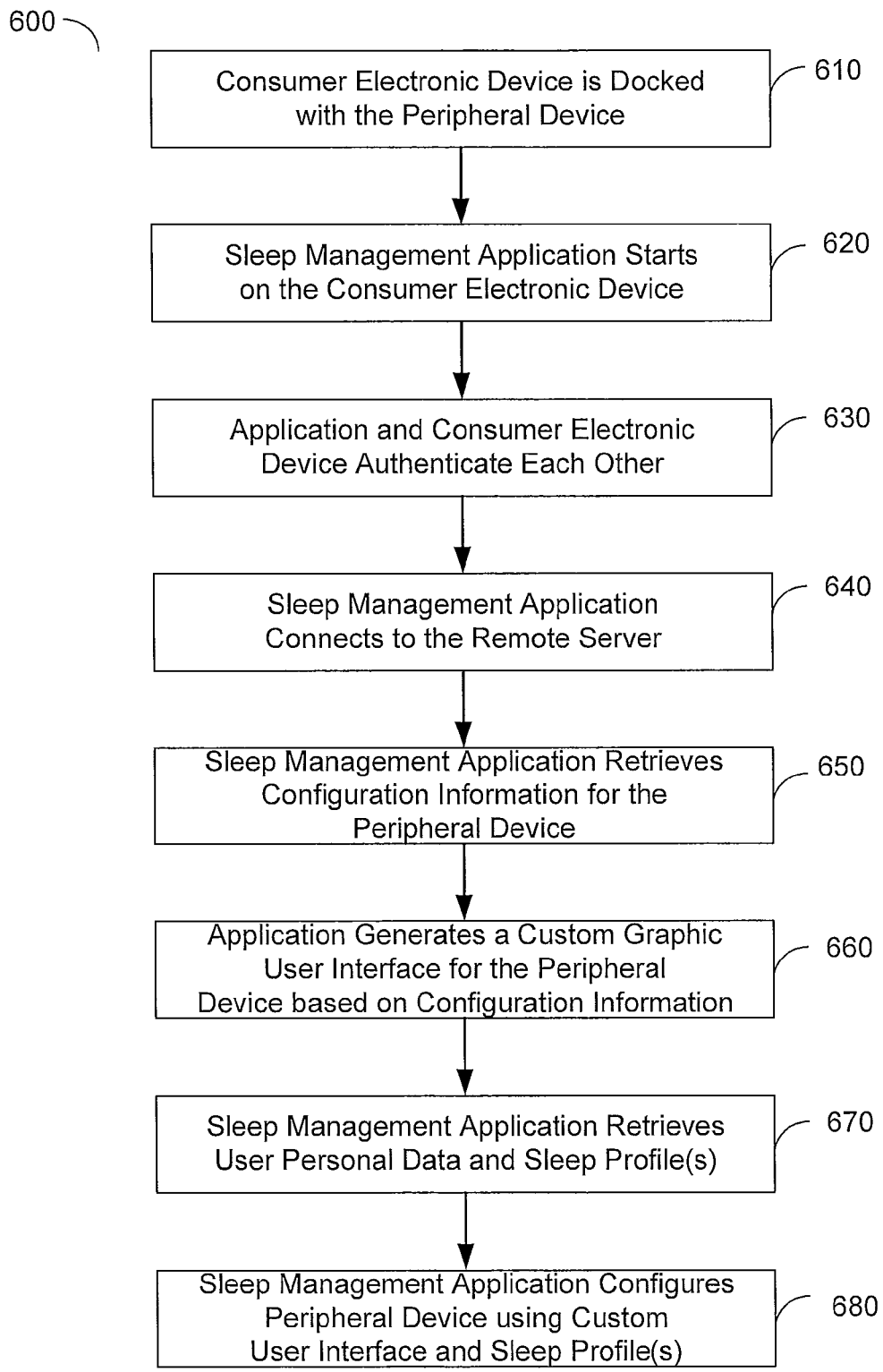

FIG. 6 illustrates an example methodology 600 for configuring a peripheral device 105 using sleep management application 115. At step 610, the consumer electronic device 120 or personal computer 130 is docked or connected (wired or wirelessly) to the peripheral device 105. At step 620, the sleep management application 115 auto starts or is manually launched by the user. At step 630, the sleep management application 115 and the consumer electronic device 120 authenticate each other by exchanging, for example, one or more device model identifier(s) and/or software version identifier(s). At step 640, the sleep management application may connect to the remote server 140 and retrieve, at step 650, configuration information about the peripheral device 105 from the remote server 140. Alternatively, this device configuration information may be already known to the application 115 and it does not need to retrieve it from the remote server 140. At step 660, the sleep management application 115 generates, based on the device configuration information, a custom user interface for configuring specific features of peripheral device 105. For example, the user interface displays only control buttons available on the specific peripheral device to which the sleep management application 115 is currently communicating. At step 670, the sleep management application 115 also retrieves from the local or remote user account database a user's personal data and sleep profiles. At step 670, the user may configure operation of the peripheral device using the custom interface. For example, the user may program preset buttons of the audio reproduction device to play specific audio files stored on the consumer electronic device 120 or personal computer 130 on which the sleep management application 115 runs or to stream Internet radio from network addresses specified in the user preferences fields of the user account 310. In addition, using the custom interface of the sleep management application 115, the user may select one of the sleep profiles associated with the peripheral device 105 to be executed by the sleep management application 115.

Figure 7:
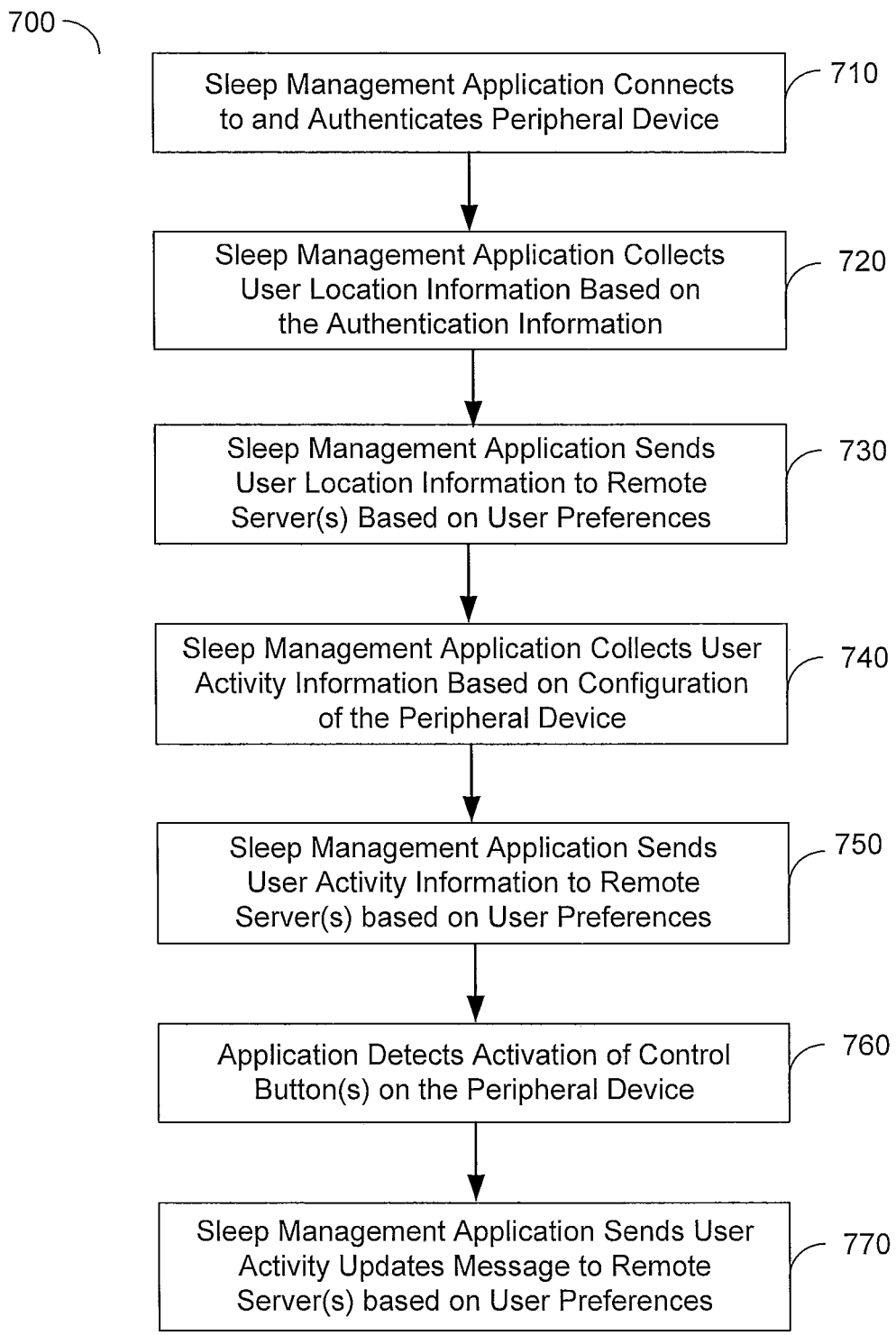

FIG. 7 illustrates an example methodology 700 for collection and distribution of user information by the sleep management application 115. At step 710, the sleep management application 115 connects to and authenticates the peripheral device 105. In an alternate arrangement, the sleep management application executes on a computing device 120, 130 without connecting to a peripheral device 105. At step 720, the application 115 determines user location based on the device authentication information. For example, the application 115 may compare the current device model identifier with the "home device" model identifier stored in the user account 310. If these identifiers are different, the application 115 may request that remote server 140, which has information about all manufactured peripheral devices, determine where the current peripheral device is located. In an alternate arrangement, wherein the sleep management application 115 executes on a computing device 120, 130 without connecting to a peripheral device 105, user location is determined using other location determining methods. By way of example, the sleep management application 115 may approximate the location of the computing device 120, 130 by requesting the location information associated with the computing device's 120, 130 assigned IP address. By way of further example, if the computing device 120, 130 is equipped with a GPS receiver, the sleep management application 115 may utilize the receiver to determine the device's location. By way of yet further example, if the computing device 120, 130 is equipped with the capacity for cellular communication, the sleep management application 115 may utilize triangulation or other such location determining techniques in order to determine the device's 120, 130 location. All of the foregoing can be accomplished, in one embodiment of the invention, by execution of code or a portion of code that comprises the sleep management application. At step 730, the application 115 checks user preferences in the user account 310 and, based on user preferences, may send user location update notifications to various messaging or social network servers 190. At step 740, the sleep management application 115 collects user activity information from the configuration settings of the peripheral device 105 and/or the computing device 120, 130. For example, the user may program an alarm setting of the peripheral device 105 (such as an audio reproduction device) and/or the computing device 120, 130 to allow the alarm to go off at 8:30 PM and to begin streaming a broadcast of football game from an Internet radio station. At step 750, the application 115 checks user preferences in the user account 310 and, based on user preferences, may send user activity update notifications to various messaging or social network servers 190. At step 760, the application 115 may detect that the user activated one of the control buttons of the peripheral device 105, such as a radio preset button of an audio reproduction device such as an alarm clock radio that tunes FM tuner to frequency 103.5 MHz. In response, the application 115 may check, at step 770, user preferences in the user account 310 and, based on user preferences, may send user activity update notifications to various messaging or social network servers 190. For example, if the detected user action took place at 9 PM, the message may indicate that the user stopped listening to the broadcast of the football game and instead is listening to music on New York dance music station 103.5 KTU, for example.

Figure 8:
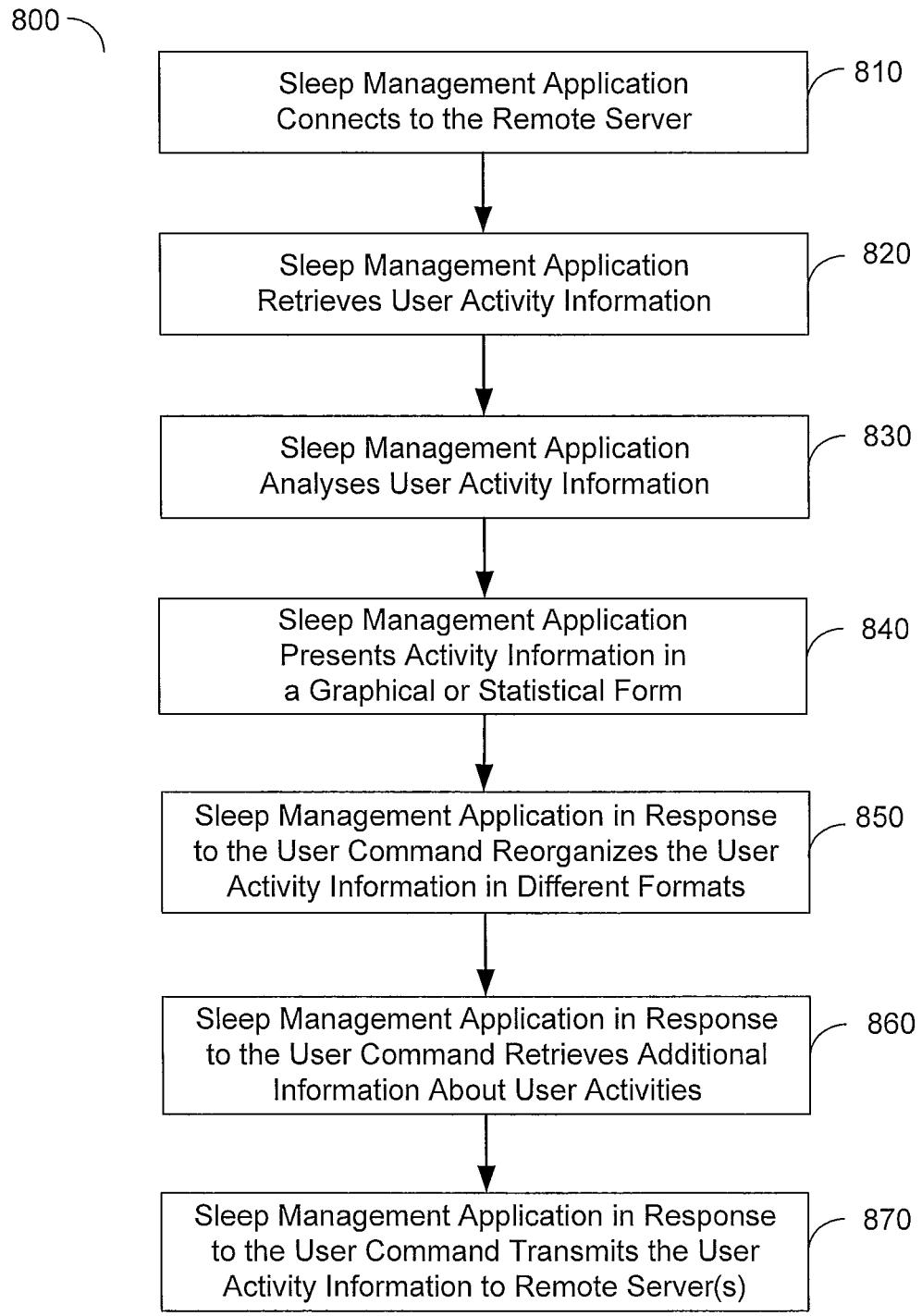

FIG. 8 illustrates an example methodology 800 for displaying user activity information by the sleep management application 115. At step 810, the application 115 connects to the remote server 140 and, at step 820, retrieves user activity information that was collected by the application for a period of time. At step 830, the sleep management application 115 analyzes the user activity data using various statistical and/or probabilistic models known in the art. At step 840, the sleep management application 115 may present user activity information in a graphical or statistical form. For example, the application 115 may generate a graph of the user's average sleep time per day for the past month versus a recommended amount of sleep or versus the amount of sleep of users of similar demographics or similar locale. In another example, the application may show what radio stations the user had listen to most during the course of a year, compare popularity rating of these radio stations, and suggest other similar radio stations. At step 850, the sleep management application 115 may reorganize the user activity information in different format or other criteria. For example, the information may be presented in a form of a pie or bar chart or in tabular form. At step 860, the user may request additional activity information to be retrieved and presented. For example, user activity information for a shorter or longer period of time may be requested by the user. As another example, certain information that has been gathered from other users (e.g., "buddies" of the user on a given social network) can be presented to the user. In this regard, the sleep management application 115 can retrieve information concerning the song, radio station, or other program that a buddy has selected as a wake up alarm and cause that selection to be used at the computing device 120, 130 or peripheral device 105. At step 870, the user may instruct the sleep management application 115 to send a portion of the user activity information to a particular email address or be posted on the user's social network web page, such as a Facebook or the like.

Figure 9:
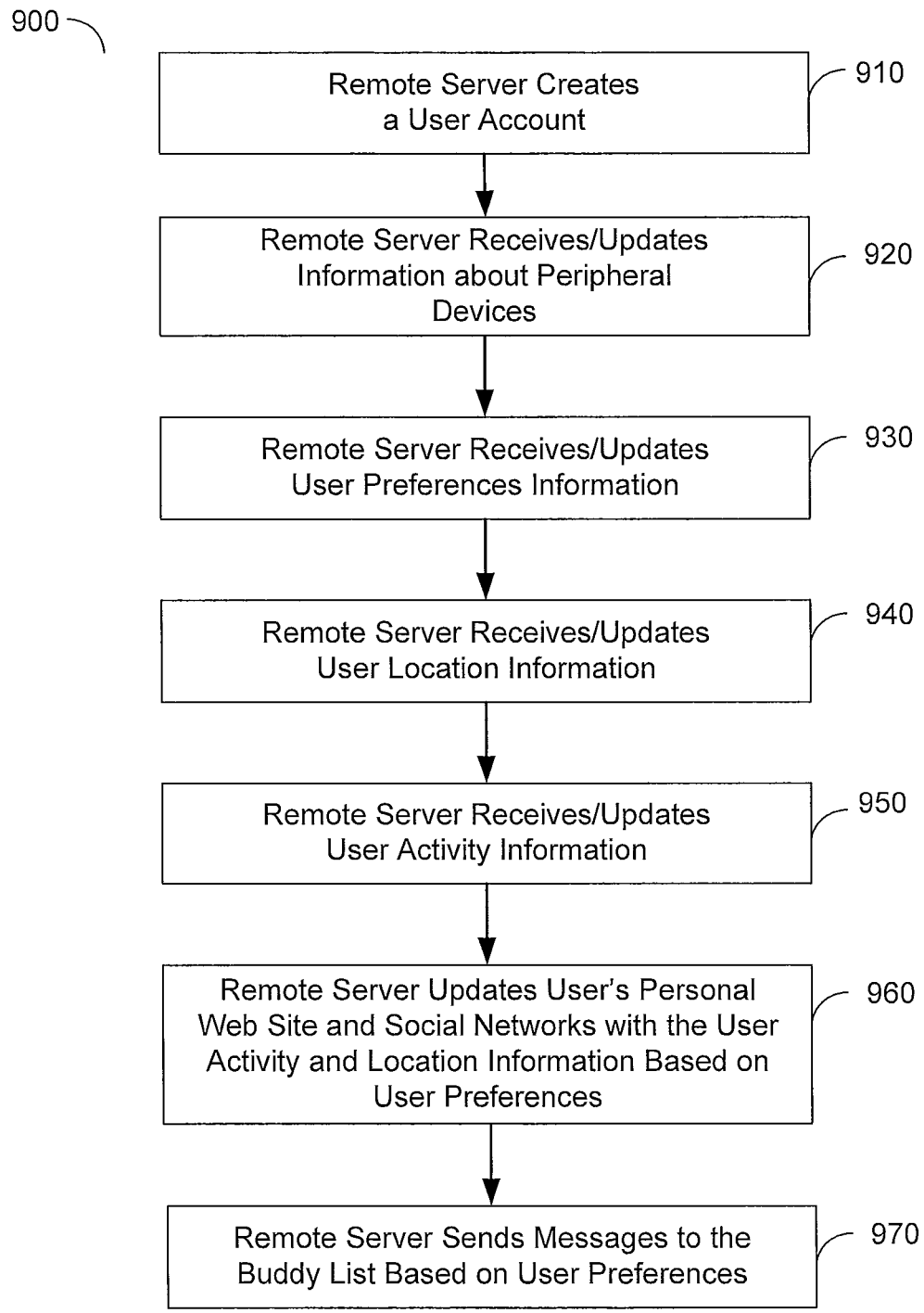

FIG. 9 illustrates an example methodology 900 for operation of the remote server 140 of the sleep management system 100. At step 910, the sleep management application 115 may request the remote server 140 to create a user account 310 in the database 160 for each new user of the system 100. At step 920, the remote server 140 receives and updates information about various peripheral devices 105 and stores this information in the database 150. At step 930, the remote server 140 receives 115 user preferences information from the sleep management application and updates this information in the user account 310. At step 940, the remote server 140 receives user location information from the sleep management application 115 and updates this information in the user account 310. At step 950, the remote server 140 receives user activity information from the sleep management application 115 and updates this information in the user account 310. At step 960, the remote server 140 may be configured to update, based on user preferences, the user's personal web site and/or social network web sites with the user activity information. At step 970, the remote server 140 may be further configured to send, based on user preferences, e-mail or instant messages to individuals on the user's buddy list.

Figure 10:
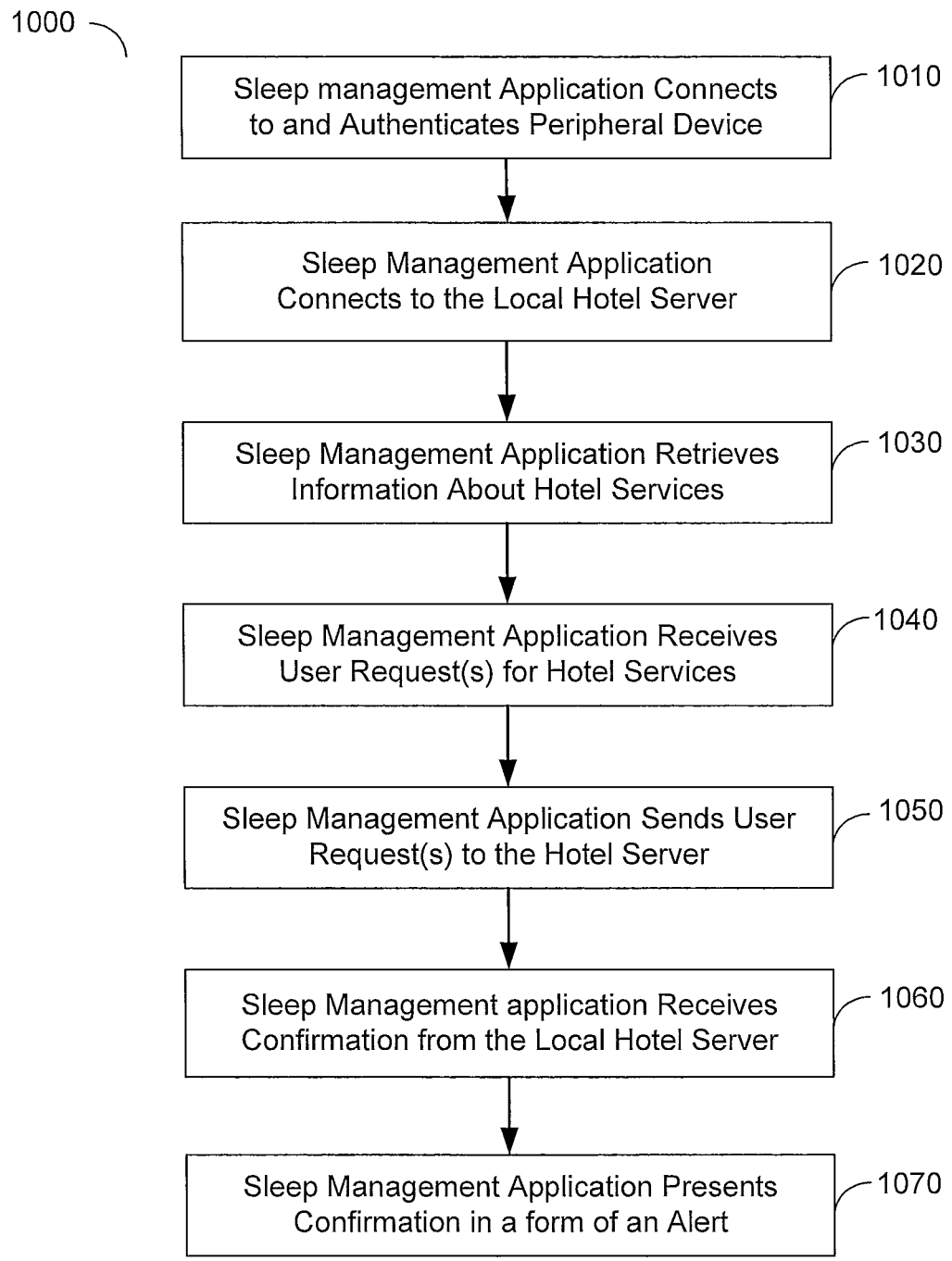

FIG. 10 illustrates an example methodology 1000 for operation of the sleep management application 115 in a hotel environment. Peripheral devices 105, such as alarm clocks and the like, can be often found in hotel rooms. The sleep management application 115 may be configured to operate with such peripheral devices 105 and with other hotel systems to provide hotel guests and application 115 users with advanced service options. At step 1010, when a consumer electronic device 120 or a personal computer 130 are connected to the peripheral device 105 located in a hotel room, the sleep management application 115 connects to and authenticates the peripheral device 105. At step 1020, the sleep management application 115 may then connect to the local hotel server 170 through the peripheral device 105. At step 1030, the sleep management application 115 may retrieve information about services provided by the hotel from the local hotel server 170. At step 1040, the application 115 receives user requests for specific hotel services, such as ordering in-room meals or other hotel services, and, at step 1050, forwards these requests to the hotel server 170. At step 1060, the application 115 may receive service request confirmation messages from the hotel server 170, and, at step 1070, present such confirmations in form of audio/visual alerts.

Figure 11:
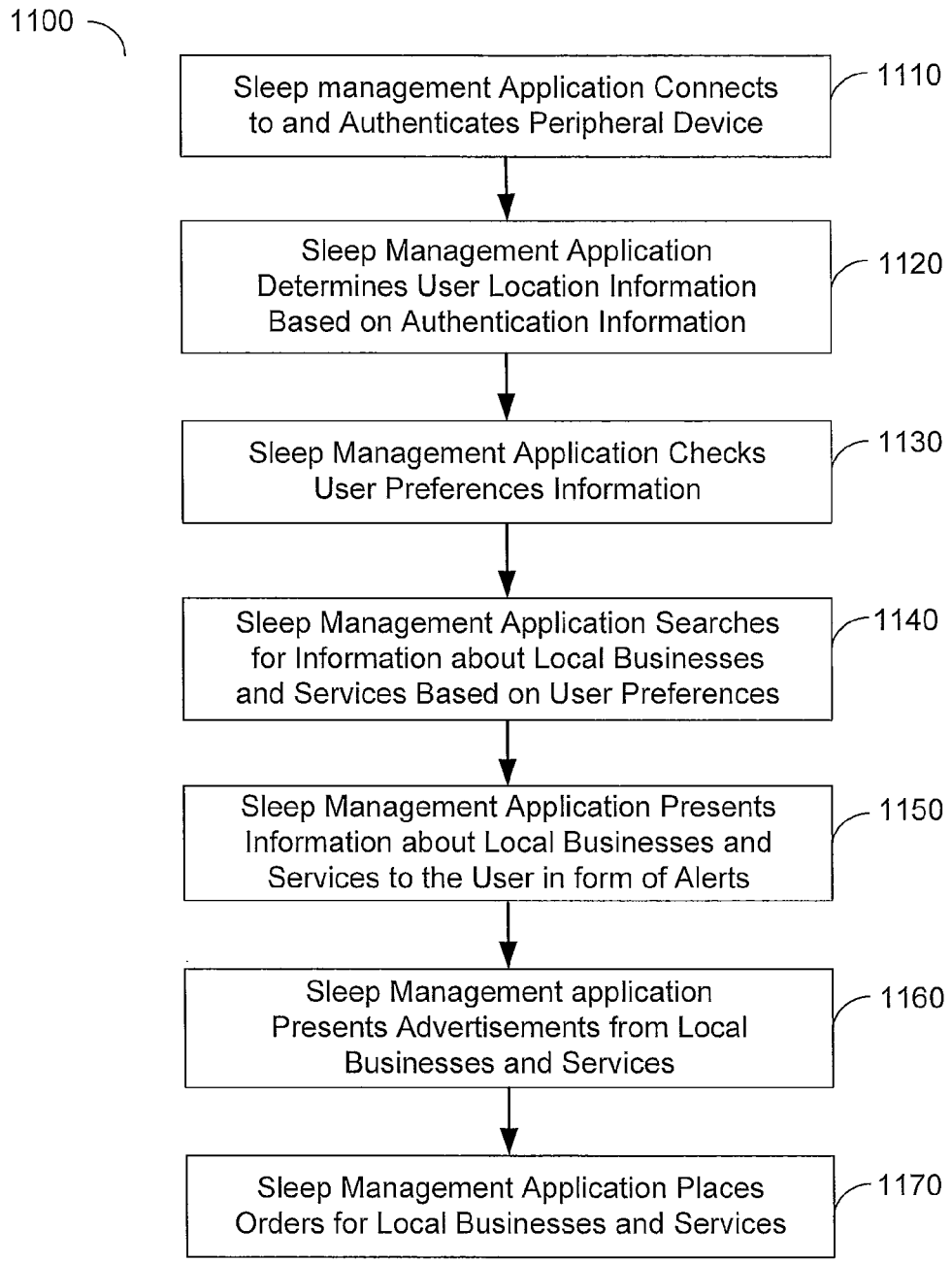

FIG. 11 illustrates an example methodology 1100 for collecting and utilizing user location information by the sleep management application 115. At step 1110, the application 115 connects to and authenticates the peripheral device 105. At step 1120, the application 115 determines user location based on the device authentication information. For example, the application 115 may compare the current device model identifier with the "home device" model identifier stored in the user account 310. If these identifiers are different, the application 115 may request that remote server 140, which has information about all manufactured peripheral devices, determine where the current peripheral device is located. At step 1130, the sleep management application 115 may check user preferences in the user account 310 and, at step 1140, search on the Internet for information about local businesses and services. At step 1140, the sleep management application 115 presents information about local businesses and services to the user as well as advertisement and promotional data. At step 1150, the user may place orders for local businesses and services thorough the application 115.

Figure 12:
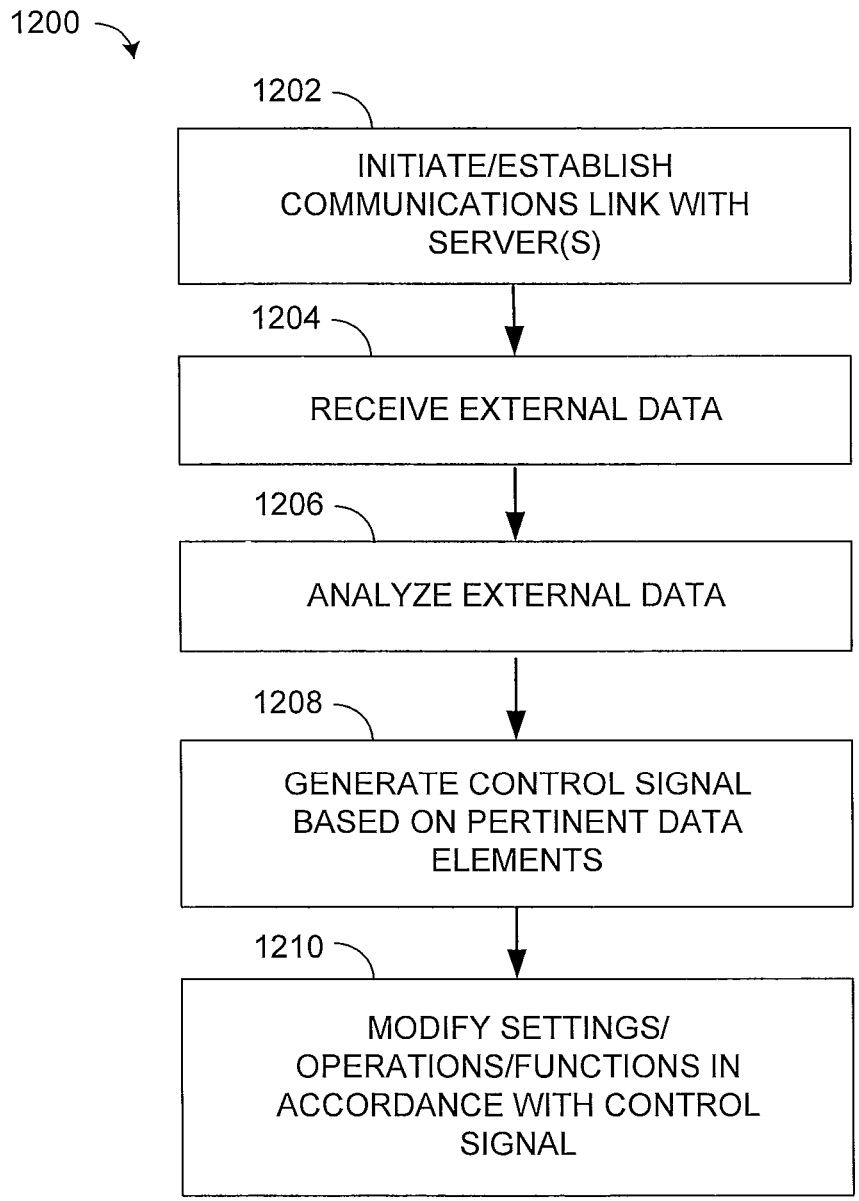

The sleep management application 115 also includes software modules that enable the application to adjust or modify one or more settings and/or configurations associated with the computing device 120, 130, the peripheral device 105, and/or the sleep management application, as illustrated in FIG. 12. In one exemplary arrangement 1200, at step 1202 the sleep management application 115 initiates and establishes a communications link with one or more server(s) 140, 170, 190. Preferably, the server(s) 140, 170, 190 maintain data pertaining to the computing device 120, 130, a peripheral device 105, and/or the user/user account. At step 1204 the sleep management application then receives external data (that is, data that is presently external to the sleep management application 115 and/or the computing device 120, 130) from the server(s) 140, 170, 190. In doing so, the sleep management application 115 and/or the computing device 120, 130 can transmit a specific query (such as a query regarding current traffic conditions in a specific area) and/or a standing query (such as weather in the user's hometown) to one or more of the server(s) 140, 170, 190. By way of example, based on the user account, the sleep management application 115 can identify the computing device's (120, 130) present location (obtained via GPS, etc., as referenced above) as well as the user's place of employment. As such, the sleep management application 115 can retrieve external data pertaining to these locations, such as traffic and/or weather conditions in the user's home and/or work location. In an alternate arrangement, the server(s) may 'push' pertinent external data to the sleep management application 115 and/or the computing device 120, 130, without a prior query. In either case, data is being provided from a remote source to influence the operation of the sleep management application and the computing device with which it cooperates, and this arrangement results in the modification of the application's configuration, at least within any limits established by the user, as described below.

Upon receiving the external data, the sleep management application 115 proceeds to analyze the external data at step 1206 in order to identify elements that pertain to the sleep management application 115, the computing device 120, 130, and/or the user/user profile. In doing so, the sleep management application 115 uses one or more software modules to parse and/or analyze the received external data to further identify elements of the external data that pertain to the computing device 120, 130, the sleep management application 115 and/or to the user/user account. By way of example, the sleep management application 115 can further analyze received local traffic/weather information to determine whether traffic and/or weather conditions may affect a user's commute or trip. Such determinations are made in regard to the received local traffic/weather information and optionally in regard to stored data concerning the travel patterns of the user, say, on a weekday morning.

At step 1208 the sleep management application 115 then generates a control signal based upon the pertinent data elements. The control signal is preferably a set of one or more instructions and/or parameters that direct the operation of the computing device 120, 130, the peripheral device 105, and/or the sleep management application 115. By way of example, based upon an identified data element that indicates that traffic and/or weather problems are occurring (or are projected to occur) that will add 25 minutes to a user's daily commute, a control signal can be generated that modifies the alarm settings of the sleep management application 115 to sound an alarm 25 minutes earlier than it was originally set for. As such, the data received from a remote server can dynamically transform or otherwise alter the user's or the device's settings, regardless of whether the user is sleeping or not present to change any settings.

Once the control signal has been generated, at step 1210 the sleep management application 115 can modify one or more settings associated with the operation of the computing device 120, 130, the peripheral device 105, and/or the sleep management application 115 in accordance with the control signal. In doing so, the sleep management application 115 implements the control signal's instructions. By way of example, the sleep management application 115 can modify an existing setting that governs the operation of the sleep management application's 115 alarm function (i.e., the alarm is presently set to ring at 7:30 AM) by implementing the control signal (i.e., an instruction to sound the alarm 25 minutes earlier), thereby resulting in an alarm setting (i.e., 7:05 AM as opposed to 7:30 AM) which is tailored to the specific circumstances relevant to the user.

It should be noted that while in one arrangement the generated control signals are applied in an automated fashion (that is, they are applied without the need for user input and/or interaction), in other arrangements the user can be prompted to review and approve/deny the implementation of one or more control signals. By way of example, the sleep management application 115 can display to a user a proposed control signal (i.e., set alarm clock 25 minutes earlier). Alternatively, the sleep management application can provide the user with the underlying information that is used by the sleep management application 115 to derive the control signal (for example, the pertinent traffic/weather data) and enable the user to either approve or deny the implementation of the control signal. Alternatively, the user can edit the parameters of the control signal (for example, the user can modify the control signal to have the alarm sound 15 minutes earlier as opposed to the originally proposed 25 minutes, or within a limit such as no more than 15 minutes earlier than any previously set time). The user can further select which settings, functions, and/or operations can be modified by generated control signals without user prompting, and which settings, functions, and/or operations require user acceptance prior to implementation.

It should be further noted that while the foregoing examples have illustrated the operation of the sleep management application 115 with respect to modifying an alarm function, the sleep management application 115 can modify nearly any function, setting and/or operation pertaining to the computing device 120, 130, the peripheral device 105, and/or the sleep management application 115. By way of example, as described in detail above, using any of a variety of means the sleep management application 115 can detect the location of the computing device 120, 130. Utilizing this information together with received external information (as described above), the sleep management application 115 can determine that the user is at a stadium during a sporting event. Accordingly, a control signal can be generated which increases the volume of the computing device's 120, 130 ringer, thereby enabling the user to hear audible notifications despite noisy surroundings.

In addition, while the foregoing description has referred periodically to interaction and/or communications between the computing device 120, 130 and/or the peripheral device 105 with one or more servers 140, 170, 190, it should be noted that in other arrangements the sleep management application 115 and other aspects and features disclosed herein are fully operable without communication with and/or connection to such servers. In such embodiments, data and/or information that is received from and/or sent to the server(s) 140, 170, 190 can instead be obtained from/transmitted to internal and/or local memory/storage accessible by computing device 120, 130 and/or peripheral device(s) 140, 170, 190. Additionally, various elements referenced above, such as user activity information 340 and sleep profiles 360 can be analyzed and control signals can be generated based upon these items.

All of the functionalities described herein whether by modules or otherwise can be accomplished, in one embodiment of the invention, by execution of code or a portion of code that comprises the sleep management application.

Figure 13:
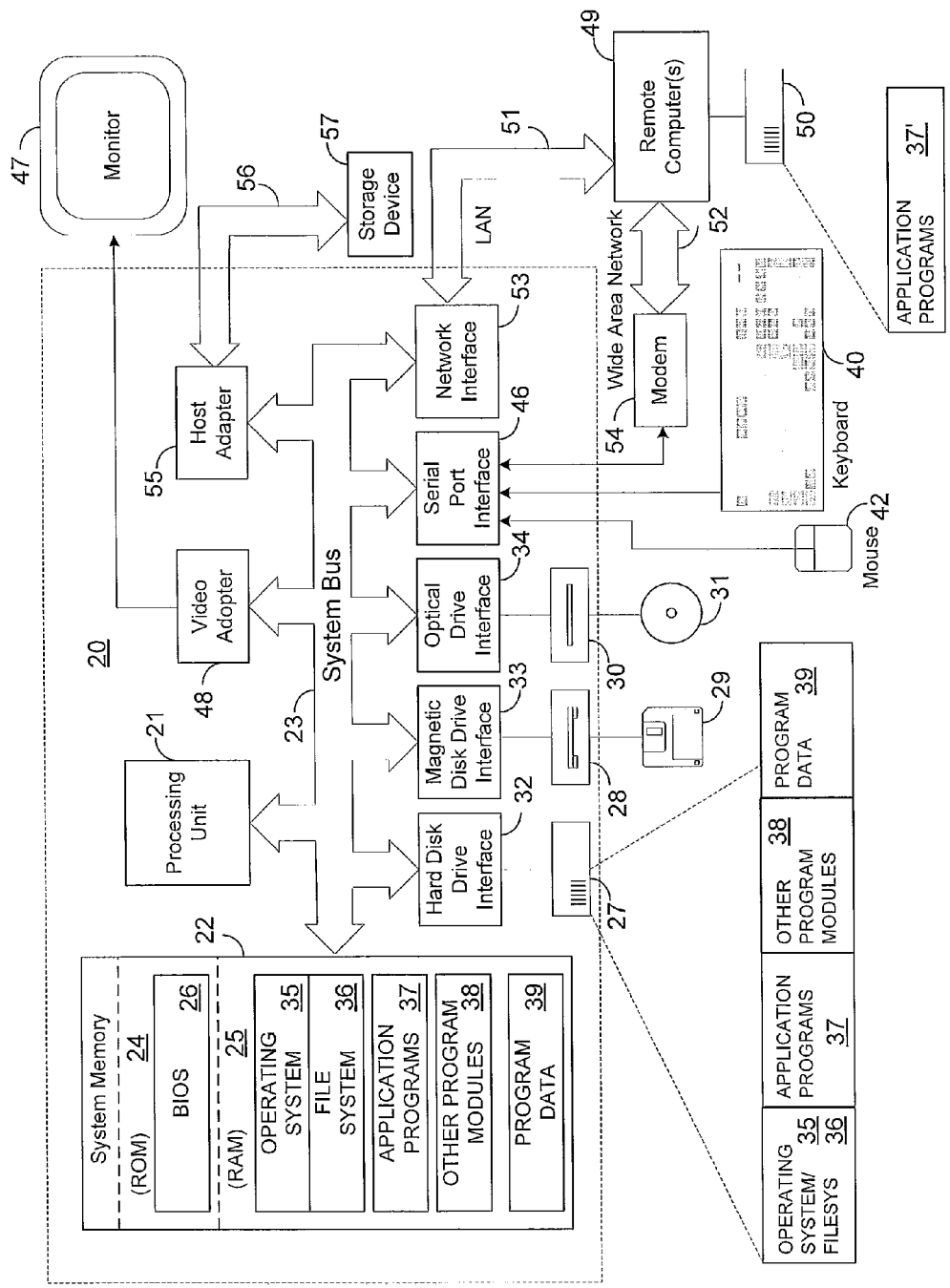
FIG. 13 illustrates a schematic block diagram of a computer system in accordance with one example embodiment.

FIG. 13 depicts an exemplary system 20 on which the sleep management application 115 may be executed. In one aspect, the system 20 may represent a personal computer 130 or the like. In another aspect, the system 20 may represent a consumer electronic device 120 or the like. In either aspect, the system 20 may include some of the components depicted in FIG. 12. For example, the system 20 may include a processing unit 21, a system memory 22, and a system bus 23 that couples various system components including the system memory 22 to the processing unit 21. The system bus 23 may be any of several types of bus structures including a memory bus or memory controller, a peripheral bus and a local bus using any of a variety of bus architectures. The system memory includes a read-only memory (ROM) 24 and random access memory (RAM) 25. A basic input/output system 26 (BIOS), containing the basic routines that help to transfer information between the elements within the computer system 20, such as during start-up, is stored in ROM 24.

The system 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules/subroutines, where each of the steps described above can be a separate module, or several steps can be aggregated into a single module, and other data for the system 20. Although the exemplary environment described herein employs a hard disk, a removable magnetic disk 29 and a removable optical disk 31, it should be appreciated by those skilled in the art that other types of computer readable media that can store data accessible by a computer, such as flash memory cards, digital video disks, RAMs, ROMs, EPROMs and the like may also be used in the exemplary operating environment.

A number of program modules may be stored on the hard disk, magnetic disk 29, optical disk 31, ROM 24 or RAM 25, including an operating system 35. The system 20 includes a file system 36 associated with or included within the operating system 35, one or more application programs 37, including the sleep management application 115, other program modules 38 and program data 39. A user may enter commands and information into the system 20 through input devices such as a keyboard 40 and pointing device 42. Other input devices may include a microphone, joystick, touch pad/screen, satellite dish, scanner or the like. These and other input devices may be connected to the processing unit 21 through a serial port connector 46 coupled to the system bus, and can be connected by other means, such as a parallel port, game port or universal serial bus (USB). A monitor 47 or some other type of display device may be connected to the system bus 23 via a video adapter 48. In addition to the monitor 47, the system 20 may include other peripheral output devices (not shown), such as speakers and printers.

The system 20 may operate in a networked environment using wired or wireless connections 51 and 52 to one or more remote computers 49 or other networked devices, including peripheral device 105. The remote computer (or computers) 49 may be represented by another computer system, a server, a router, a network PC, a peer device or other common network node, and typically includes many or all of the elements described above relative to the system 20, although only a memory storage device 50 has been illustrated. The wired or wireless connections may include a local area network (LAN) 51 or a wide area network (WAN) 52. Such networking environments are common in offices, enterprise-wide computer networks, Intranets and the Internet.

When used in a LAN networking environment, the system 20 is connected to the local network 51 through a network card or adapter 53. When in a WAN networking environment, the system 20 typically includes a modem 54 or other means for establishing communications over the wide area network 52, such as the Internet. The modem 54, which may be internal or external, is connected to the system bus 23 via the serial port connector 46. In a networked environment, program modules depicted relative to the system 20, or portions thereof, may be stored in the remote memory storage device. It will be appreciated that the network connections shown are exemplary and other means of establishing a communications link between system 20 and other computer systems may be used.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system and/or across a network such as the Internet with other systems by way of the signal.

In one or more aspects, the functions described herein may be implemented in hardware, software, firmware, or any combination thereof. If implemented in software, the functions may be stored or transmitted as one or more instructions or code on a computer readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs usually reproduce data optically with lasers. Combinations of the above should also be included within the scope of computer-readable media.

The methods described herein have been provided in connection with flow diagrams that facilitate a description of the principal processes; however, certain blocks can be invoked in an arbitrary order, such as when the events drive the program flow such as in an object-oriented program. Accordingly, the flow diagram is to be understood as an example flow and that the blocks can be invoked in a different order than as illustrated.

It should be noted that while much of the forgoing description has related to a system and method for sleep management, the systems and methods disclosed herein can be applied in a broad range of settings beyond sleep management. By way of example, the systems and methods described herein can be modified to provide scheduling updates and/or notifications, and to adjust scheduling preferences and settings in response to control signals generated based upon received external data.

In the interest of clarity, not all of the routine features of the implementations described herein are shown and described. It will be appreciated that in the development of any such actual implementation, numerous implementation-specific decisions must be made in order to achieve the developer's specific goals, such as compliance with application-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A sleep management device, comprising:
   a processor operatively coupled to a memory, wherein the processor is configured to control operation of the sleep management device;
   a display included with the sleep management device that is operable to display at least the time of day;
   an audio reproduction device associated with the sleep management device that is operative to output audio; and
   at least one connector that is configured for docking a consumer electronic device to the sleep management device;
   wherein, when the consumer electronic device is docked to the sleep management device and further wherein when the consumer electronic device operates a sleep management application, the sleep management device is authenticated so as to be responsive to the sleep management application and further comprising a communication link to a remote server having external data pertaining to the consumer electronic device or to a user of the consumer electronic device;
   wherein the sleep management application, when executed by the consumer electronic device, causes the consumer electronic device to:
      initiate communications over the communication link between the sleep management application and the remote server;
      receive the external data from the remote server;
      analyze the external data to identify elements that pertain to the sleep management application;
      generate a control signal based on the identified elements;
      modify a setting governing an operation of an alarm function in accordance with the control signal; and
      activate the sleep management device in accordance with the modified setting.

2. The sleep management device of claim 1, wherein operation of the sleep management device is controlled using the sleep management application.

3. The sleep management device of claim 1, wherein the sleep management application generates a custom interface that reflects functionality of the sleep management device.

4. The sleep management device of claim 1, wherein the sleep management application, when executed by the consumer electronic device, causes the consumer electronic device to:
   update a user account in response to an operation of the sleep management application.

5. The sleep management device of claim 4, wherein the user account includes user activity information.

6. The sleep management device of claim 4, wherein the user account includes a user sleep profile.

7. The sleep management device of claim 4, wherein the sleep management application, when executed by the consumer electronic device, causes the consumer electronic device to:

analyze the user account to identify behavioral trends.

8. The sleep management device of claim 1, wherein the external data comprises location information.

9. The sleep management device of claim 1, wherein the external data comprises weather information.

10. The sleep management device of claim 1, wherein the external data comprises traffic information.

11. The sleep management device of claim 1, wherein the external data comprises scheduling information.

12. The sleep management device of claim 1, wherein the sleep management application, when executed by the consumer electronic device, further causes the consumer electronic device to present the control signal to the user prior to the modifying step.

13. The sleep management device of claim 12, wherein the sleep management application, when executed by the consumer electronic device, causes the consumer electronic device to receive an input from the user approving or denying a modification in accordance with the control signal, after the presenting step.

14. The sleep management device of claim 1, wherein the sleep management device is authenticated so as to be responsive to the sleep management application when the consumer electronic device is docked to the sleep management device in a wireless manner.

15. The sleep management device of claim 1, wherein the sleep management device is authenticated so as to be responsive to the sleep management application when the consumer electronic device is docked to the sleep management device in a wired manner.

\* \* \* \* \*